(12) United States Patent
Lacock et al.

(10) Patent No.: US 8,658,716 B2
(45) Date of Patent: *Feb. 25, 2014

(54) MULTILAYER POLYMERIC ARTICLE HAVING A METALLIC VARIEGATED LOOK

(75) Inventors: Steven B. Lacock, Boyertown, PA (US); James Bradley, Cinnaminson, NJ (US); Andrew S. Horvath, Bala Cynwyd, PA (US)

(73) Assignee: Arkema France, Colombes (FR)

( * ) Notice: Subject to any disclaimer, the term of this patent is extended or adjusted under 35 U.S.C. 154(b) by 1124 days.

This patent is subject to a terminal disclaimer.

(21) Appl. No.: 11/866,606

(22) Filed: Oct. 3, 2007

(65) Prior Publication Data

US 2009/0093568 A1    Apr. 9, 2009

(51) Int. Cl.
| | |
|---|---|
| *C09D 5/29* | (2006.01) |
| *B32B 3/00* | (2006.01) |
| *B32B 27/00* | (2006.01) |
| *C08K 3/10* | (2006.01) |
| *C08K 3/18* | (2006.01) |
| *C08K 3/22* | (2006.01) |
| *C08K 3/34* | (2006.01) |

(52) U.S. Cl.
USPC ........... 523/171; 428/172; 428/412; 428/500; 524/403; 524/493; 524/496; 524/430; 524/431; 524/497

(58) Field of Classification Search
USPC ........... 428/412, 172, 500; 523/171; 524/171, 524/492, 493, 495, 496, 497, 1, 437, 403, 524/430, 431
See application file for complete search history.

(56) References Cited

U.S. PATENT DOCUMENTS

| | | | | |
|---|---|---|---|---|
| 5,700,566 | A * | 12/1997 | Muller et al. | 428/332 |
| 6,486,251 | B1 * | 11/2002 | Patel | 524/439 |
| 6,841,612 | B1 * | 1/2005 | Yang et al. | 524/523 |
| 2002/0001730 | A1 * | 1/2002 | Scheibelhoffe et al. | 428/517 |
| 2003/0204019 | A1 * | 10/2003 | Ding et al. | 525/191 |
| 2004/0097662 | A1 * | 5/2004 | Gaggar et al. | 525/469 |
| 2005/0095433 | A1 * | 5/2005 | Bogerd et al. | 428/411.1 |
| 2005/0282000 | A1 * | 12/2005 | Howie, Jr. | 428/323 |
| 2006/0053968 | A1 * | 3/2006 | Schuster et al. | 75/255 |
| 2006/0069208 | A1 * | 3/2006 | Dhawan et al. | 525/191 |
| 2006/0122332 | A1 * | 6/2006 | Yang et al. | 525/191 |
| 2007/0009752 | A1 * | 1/2007 | Lefebvre et al. | 428/500 |

* cited by examiner

*Primary Examiner* — Ling Choi
*Assistant Examiner* — Ronald Grinsted
(74) *Attorney, Agent, or Firm* — Thomas F. Roland

(57) ABSTRACT

The invention relates to extruded polymeric sheet and articles with an appearance and a texture that can be varied to produce natural-looking variegated materials, that have a metallic or opalescent look. The appearance can simulate natural materials, such as granite, minerals, stone, metal ore. The extruded polymer sheet or article contains at least one polymer composite appearance layer having crosslinked polymer particles and metallic and/or pearlescent materials distributed in a thermoplastic matrix. The thermoplastic matrix can be pigmented or unpigmented. There extruded sheet or article has a transparent thermoplastic cap layer on the side facing the environment. The particle-containing layer can be coextruded in a multi-layer sheet that could include substrate layers and the cap layer.

16 Claims, No Drawings

MULTILAYER POLYMERIC ARTICLE HAVING A METALLIC VARIEGATED LOOK

FIELD OF THE INVENTION

The invention relates to extruded polymeric sheet and articles with an appearance and a texture that can be varied to produce natural-looking variegated materials, that have a metallic or opalescent look. The appearance can simulate natural materials, such as granite, minerals, stone, metal ore. The extruded polymer sheet or article contains at least one polymer composite appearance layer having crosslinked polymer particles and metallic and/or pearlescent materials distributed in a thermoplastic matrix. The thermoplastic matrix can be pigmented or unpigmented. There extruded sheet or article has a transparent thermoplastic cap layer on the side facing the environment. The particle-containing layer can be coextruded in a multi-layer sheet that could include substrate layers and the cap layer.

BACKGROUND OF THE INVENTION

The spa market, especially for coextrusion is growing rapidly. Sheet extruders are seeking ways to create new designs, colors and effects, in an effort to differentiate their products in this growing market.

Current spa units are manufactured by thermoforming a cast acrylic sheet, extruded monolithic polymethyl methacrylate (PMMA) sheet, coextruded ABS/PMMA, or ABS/ASA sheet. The cast acrylic sheet used in these applications can exist in many different textures and colors, including those having a uniform distribution of color and mineral particles, such as described in U.S. Pat. No. 5,705,552; and U.S. Pat. No. 6,562,927; and a variegated non-homogeneous granite appearance as disclosed in U.S. Pat. No. 7,250,472.

There are several drawbacks to using a cast sheet in spa manufacture, as compared to using extruded sheet. In a cast-sheet process, it is far more difficult to change colors and textures than in an extrusion in which a larger variety of colors and appearances can be manufactured. The extrusion process allows for direct production of a multi-layer sheet, which can include the particle layer, as well as substrate and cap layers in a single multi-layer extrusion process. Extruded sheet also can be made to produce a more textured surface during thermoforming than an article made form a cast sheet. This extra flexibility in manufacturing provides a greater ability to change or control the surface texture by changing the cap thickness, or by embossing the surface with a patterned roll. The production of sheet by an extrusion process, also allows for an even distribution of polymer particles and metallic compounds, due to the increase and efficient mixing, without a time to settle during further polymerization of a matrix syrup—as in a cast process.

U.S. Pat. No. 6,841,612, incorporated herein by reference, describes a simulated mineral article composed of crosslinked polymer particles in a thermoplastic matrix, the composition being capable of multiple passes through extrusion or molding. It was found that the levels of the crosslinked polymer particles in this patent had to be lowered when used in combination with the metallic and/or opalescent materials, to produce useful sheet.

Surprisingly it was found that extruded sheet having an evenly distributed combination of crosslinked particles, and metal or opalescent materials in a thermoplastic matrix can be produced having the desired appearance and textures. The extruded layer is protected by a cap layer. The particle-containing appearance layer could be extruded by itself to form sheets and profiles, or could be co-extruded or multi-extruded, for instance over a substrate and capped by the transparent cap layer. The extruded sheet can then be thermoformed into a final article.

SUMMARY OF THE INVENTION

The invention relates to a multi-layer polymer composition comprising:
 a) a thermoplastic polymer composite layer comprising:
  1) a thermoplastic matrix polymer;
  2) 2 to 28 weight percent, based on the weight of the polymer composite, of one or more particulate crosslinked polymers dispersed within the matrix polymer, wherein said crosslinked polymer has an average particle size of from 0.2 to 1.2 millimeters, wherein said crosslinked polymer is visually differentiable from the thermoplastic matrix polymer;
  3) 3 to 10 weight percent, based on the weight of the polymer composite, metallic or opalescent materials also dispersed; and
  4) 1 to 2 weight percent, based on the weight of the polymer composite of at least one organic or inorganic pigment; and
 b) a transparent thermoplastic cap layer.

The invention further relates to an article formed from the multi-layer polymer composition.

DETAILED DESCRIPTION OF THE INVENTION

The invention relates to a capped thermoplastic composite, where the composite has at least three components: a thermoplastic matrix (pigmented or unpigmented), crosslinked polymer particles, and a metallic or pearlescent compound. The thermoplastic composite is capped with a transparent thermoplastic.

As used herein, the term "thermoplastic" refers to polymers that are reversibly deformable (able to be softened) after being heated above their softening or glass transition temperatures and then cooled; these materials are capable of being repeatedly melt processed in plastic manufacturing machinery such as, for example, injection molding, extrusion, blow molding, compression molding and rotational molding.

As used herein, the term "thermoset" refers to polymers that are irreversibly deformable after they have been prepared in an initial configuration, that is, once the polymer is formed by chemical crosslinking (usually thermally induced) it is no longer amenable to thermal processing into other physical forms. As is generally, accepted by those skilled in the art, thermoset polymers are polymers that include crosslinking as part of their preparation or have been subjected to crosslinking reactions as part of a post-treatment step, for example, allyl ester polymers, epoxy resins, crosslinked acrylic polymers and crosslinked styrenic polymers produced by suspension, emulsion, continuous-cast or cell-cast polymerization methods.

As used herein, the term "thermoforming" refers to the processing of polymers into 3-dimensional molded forms from flat plastic preformed materials, such as film or sheet, under the influence of heat, pressure or vacuum or combinations thereof.

As used herein the term "particulate material" refers to any material in the form of separate particles or divided fragments, such as, for example, pellets, beads, powders, granules and chips.

As used herein, the term "alkyl(meth)acrylate" refers to either the corresponding acrylate or methacrylate ester; similarly, the term "(meth)acrylic" refers to either acrylic or methacrylic acid and the corresponding derivatives, such as esters or amides.

As used herein, the term "article" refers to a finished or intermediate solid composition made up of at least the extruded polymer composite and transparent thermoplastic cap layer. The article may be in the form of a sheet or profile directly from the extruder, or may refer to a spa or other finished product that is formed from the extruded sheet or profile—such as by thermoforming.

As used herein, all percentages referred to will be expressed in weight percent (%), based on total weight of polymer or composition involved, unless specified otherwise. As used herein, the term "copolymer" or "copolymer material" refers to polymer compositions containing units of two or more monomers or monomer types. As used herein, "extrusion blended" and "extrusion compounded" are used synonymously and refer to the intimate mixing of two or more materials by melt extrusion.

Thermoplastic materials useful as the thermoplastic matrix of the present invention include, but are not limited to, alkyl (meth)acrylate polymers and copolymers having little or no crosslinker, acrylonitrile/butadiene/styrene (ABS) terpolymer, acrylonitrile/styrene/acrylate (ASA) copolymer, polycarbonate, polyesters (such as poly(butylene terephthalate) and poly(ethylene terephthalate), methyl methacrylate/butadiene/styrene (MBS) copolymer, high impact polystyrene (HIPS), acrylonitrile/acrylate copolymer, acrylonitrile/methyl methacrylate copolymer, impact modified polyolefins, impact modified polyvinyl chloride (PVC), and impact modified polymethacrylates. Preferred thermoplastic matrix materials are alkyl(meth)acrylate polymers and copolymers, and more preferably an impact modified polymethacrylate.

The preferred alkyl(meth)acrylate polymers and copolymers are synthesized from $C_{1-22}$ alkyl(meth)acrylate monomers. Preferably the thermoplastic matrix material comprises a polymer or copolymer of methyl methacrylate (MMA); typical copolymers include 80 to 99% MMA and 1 to 20%, preferably 1 to 5%, of $C_{1-10}$ alkyl acrylates, such as methyl acrylate and ethyl acrylate (EA). A suitable commercially available poly(methyl methacrylate) type thermoplastic matrix material is Plexiglas V-grade molding powder.

The thermoplastic materials are prepared by conventional means and made into particulate form, such as pellets or granules, which can then be extruded into sheet.

The thermoplastic matrix may be based entirely on the aforementioned thermoplastic polymers or the thermoplastic matrix may optionally contain modifier additives, such as impact modifiers, in addition to the aforementioned thermoplastic polymers. In general, the thermoplastic matrix comprises 50 to 100% poly(alkyl(meth)acrylate) and zero to 50% impact modifier, based on the weight of thermoplastic matrix. Typically, the thermoplastic matrix contains 25 to 100%, preferably 30 to 70%, more preferably 45 to 60% and most preferably 50 to 60%, thermoplastic polymer, such as poly(alkyl(meth)acrylate); and zero to 75%, preferably 30 to 70%, more preferably 40 to 55% and most preferably 40 to 50%, impact modifier, based on the total weight of thermoplastic matrix. Suitable impact modifiers include, for example, elastomeric polymers such as graft polymers of methyl methacrylate and styrene on butadiene (MBS), graft polymers of acrylonitrile and styrene on butadiene (ABS), copolymers of styrene and butadiene, poly(butyl acrylate) and poly(2-ethylhexyl acrylate) and copolymers thereof, copolymers of butyl acrylate and methyl acrylate, terpolymers of butyl acrylate/ styrene/methyl methacrylate, chlorinated polyethylene, acrylate block polymers, styrene block polymers, ethylene/propylene/diene copolymer (EPDM), ethylene/vinyl acetate copolymers, acrylonitrile/styrene/acrylic ester terpolymers, styrene-maleic anhydride copolymers and core-shell multistage sequentially-produced polymers. Preferred impact modifiers include MBS polymers, core-shell multi-stage sequentially-produced polymers, and styrene and acrylate block polymers, as well as block copolymers formed by a controlled radical polymerization process.

Typically the multi-stage polymer comprises at least three stages in a sequence of 10 to 40%, preferably 20 to 40%, of the first stage; 20 to 60%, preferably 30 to 50%, of the second stage; and 10 to 70%, preferably 20 to 50%, of the third stage, based on the total weight of the multi-stage polymer.

Particulate crosslinked polymers useful in the present invention include, but are not limited to, crosslinked vinyl polymers (prepared from monoethylenically unsaturated monomers and various multifunctional crosslinking monomers) and crosslinked condensation polymers (such as polyepoxy resins and polyesters, for example, poly(butylene terephthalate) and poly(ethylene terephthalate). Thermoset polymers represent one class of crosslinked polymers useful in the present invention.

Suitable monoethylenically unsaturated monomers useful in preparing particulate crosslinked polymers of the present invention include vinylaromatic monomers, ethylene and substituted ethylene monomers.

Suitable vinylaromatic monomers include, for example, styrene and substituted styrenes, such as .alpha.-methylstyrene, vinyltoluene, ortho-, meta- and para-methylstyrene, ethylvinylbenzene, vinylnaphthalene and vinylxylenes. The vinylaromatic monomers can also include their substituted counterparts, for example, halogenated derivatives, that is, containing one or more halogen groups (such as fluorine, chlorine and bromine).

Another class of suitable monoethylenically unsaturated monomers is ethylene and substituted ethylene monomers, for example: .alpha.-olefins such as propylene, isobutylene and long chain alkyl .alpha.-olefins (such as $C_{10-20}$ alkyl olefins); vinyl alcohol esters such as vinyl acetate and vinyl stearate; vinyl halides such as vinyl chloride, vinyl fluoride, vinyl bromide, vinylidene chloride, vinylidene fluoride and vinylidene bromide; vinyl nitrites such as acrylonitrile and methacrylonitrile; acrylic acid and methacrylic acid and derivatives such as corresponding amides and esters; maleic acid and derivatives such as corresponding anhydride, amides and esters; fumaric acid and derivatives such as corresponding amides and esters; itaconic and citraconic acids and derivatives such as corresponding anhydrides, amides and esters.

A preferred class of monomers useful in preparing the crosslinked polymers of the present invention are (meth) acrylic monomers, particularly $C_{1-22}$ alkyl(meth)acrylate monomers. Examples of the alkyl(meth)acrylate monomer where the alkyl group contains from 1 to 6 carbon atoms are methyl methacrylate (MMA), methyl acrylate and ethyl acrylate (EA), propyl methacrylate, butyl methacrylate (BMA), butyl acrylate (BA), isobutyl methacrylate (IBMA), hexyl and cyclohexyl methacrylate, cyclohexyl acrylate and combinations thereof.

Examples of alkyl(meth)acrylate monomers where the alkyl group contains from 7 to 22 carbon atoms are 2-ethylhexyl acrylate (EHA), 2-ethylhexyl methacrylate, octyl methacrylate, decyl methacrylate, isodecyl methacrylate (IDMA, based on branched alkyl isomer mixture), undecyl methacrylate, dodecyl methacrylate (also known as lauryl methacrylate), tridecyl methacrylate, tetradecyl methacrylate (also known as myristyl methacrylate), pentadecyl methacrylate and combinations thereof. Also useful are: dodecyl-pentadecyl methacrylate (DPMA), a mixture of linear and branched isomers of dodecyl, tridecyl, tetradecyl and pentadecyl methacrylates; and lauryl-myristyl methacrylate (LMA), a mixture of dodecyl and tetradecyl methacrylates.

Additional $C_{7-22}$ alkyl(meth)acrylate monomers include hexadecyl methacrylate (also known as cetyl methacrylate), heptadecyl methacrylate, octadecyl methacrylate (also known as stearyl methacrylate), nonadecyl methacrylate, eicosyl methacrylate, behenyl methacrylate and combinations thereof; also useful are cetyl-eicosyl methacrylate (CEMA), a mixture of hexadecyl, octadecyl, and eicosyl methacrylate; and cetyl-stearyl methacrylate (SMA), a mixture of hexadecyl and octadecyl methacrylate.

Suitable crosslinking monomers include, for example, ethylene glycol dimethacrylate, polyethylene glycol diacrylate and dimethacrylate, propylene glycol dimethacrylate and diacrylate, glycidyl methacrylate, divinylbenzene, triallyl isocyanurate, N-(hydroxymethyl)acrylamide, allyl acrylate, allyl methacrylate, N,N'-methylene diacrylamide and dimethacrylamide, triallyl citrate, trimethylolpropane triacrylate, trimethylolpropane trimethacrylate, and diethyleneglycol divinyl ether. Preferred crosslinkers are allyl methacrylate, ethylene glycol dimethacrylate and divinylbenzene. The amount of crosslinking monomer is generally from 0.1 to 20%, typically from 0.5 to 10%, preferably from 0.5 to 5%, more preferably from 1 to 4% and most preferably from more than 1.5% up to 3%, based on the total weight of the crosslinked polymer, that is, combined weight of monoethylenically unsaturated monomer and the crosslinking monomer.

The crosslinked polymer also contains inert filler that may be conveniently added to a cell casting syrup before starting the polymerization. Suitable inert fillers, include, for example, alumina (including hydrated forms), titanium dioxide, zinc oxide, zinc sulfide, iron oxide, barium sulfate, zirconium silicate, strontium sulfate, calcium carbonate, carbon black, powdered glass, silica, clay and talc. Preferred inert fillers include titanium dioxide, iron oxide, carbon black, silica, alumina, pigments and combinations thereof; most preferred is titanium dioxide. Conventional pigments or colorants include organic dyes (for example azo, anthraquinone, perinone, quinoline, pyrazolone, dioxazine, isoindoline, phthalocyanine, quinacridone and coumarin derivatives) and inorganic salts (cadmium, chromates, iron blue, cobalt blue and ultramarine blue). Typically, the amount of inert filler is from 0.1 to 15%, preferably from 0.2 to 10% and more preferably from 0.3 to 5%, based on the total weight of crosslinked polymer. The purpose of the inert filler is to enhance the visual differentiation between the crosslinked polymer component and the thermoplastic matrix component to provide the "mineral-like" or "granite-like" appearance of the finished composite plastics composition.

Optionally, the crosslinked polymer may contain conventional adjuvants, known to those skilled in the art, for various purposes, for example: dyes, pigments, antioxidants, ultraviolet stabilizers, dispersants, processing aids (such as spray drying aids, lubricants and mold-release agents), flame retardants, polymerization-rate-moderators and viscosity controlling materials. In addition, these same conventional adjuvants may be conveniently added at later stages in the production of the composite plastics composition, for example, during preparation of the thermoplastic material used as the thermoplastic matrix (described below) or during the production of the composite plastics composition itself where the crosslinked polymer and thermoplastic material are extrusion blended or compounded.

Typically, the particulate crosslinked polymers used according to the present invention are selected from the group consisting of crosslinked poly(alkyl(meth)acrylate), crosslinked poly(vinylaromatic), crosslinked polyester, crosslinked polyolefin, mixtures and corresponding copolymers thereof. Preferred crosslinked polymers are crosslinked poly(alkyl(meth)acrylates) and crosslinked polystyrene where the crosslinked polymer comprises 90 to 99.5% monomer units selected from one or more of vinylaromatic monomer and (meth)acrylic monomer and 0.5 to 10% crosslinker, based on the weight of crosslinked polymer.

The crosslinked polymer material is conveniently prepared by a cell casting process, for example. In a typical cell casting process a monomer syrup containing the monoethylenically unsaturated monomers, a crosslinking agent and a free-radical initiator is subjected to a temperature suitable for polymerization, depending on the monomers and initiators used. Preferred monoethylenically unsaturated monomers are alkyl (meth)acrylate monomers, for example, $C_{1-4}$ alkyl(meth) acrylates, such as MMA (typically 80 to 99.5% and preferably from 95 to 99.5%, based on the total weight of monomers), methylacrylate or EA (typically from zero to 20%, preferably from 1 to 8% and more preferably from 0.5 to 5%, based on the total weight of monomers), propyl methacrylate, BMA, BA, IBMA and combinations thereof. Optionally, acrylic or methacrylic acid may be included, typically from zero to 2%, based on the total weight of monomers.

After the crosslinked polymer is prepared, such as by cell cast polymerization, it is comminuted to a particulate material by known processes, for example, chipping, crushing, grinding, shredding or any granulation method; if suspension or emulsion polymerization processes are used to prepare the crosslinked polymer, conventional isolation processes used to recover the crosslinked polymer in particulate form include, for example filtration, coagulation and spray drying. The dimensions of the particulate crosslinked polymer are typically from 0.2 to about 1.2 millimeters (mm) or about 16 to 70 U.S. standard mesh. Generally, the particle size of the particulate crosslinked polymer is substantially from 0.25 to 1.2 mm (16 to 60 mesh), preferably from 0.3 to 1.2 mm (16 to 50 mesh), more preferably from 0.4 to 1.0 mm (18 to 40 mesh) and most preferably from 0.4 to 0.85 mm (20 to 40 mesh). When the particle size of the crosslinked polymer is smaller than about 70 mesh or larger than about 16 mesh, the extrusion blending of the crosslinked polymer into the thermoplastic matrix becomes problematic, for example "stranding" problems, and the desired "speckle-like" or "mineral-like" effect may not be readily attained in the final decorative or architectural article.

The metal or pearlescent material is present in the thermoplastic composite at from 0.4 to 10 weight percent, and preferably 3.5 to 6.5% weight percent, based on the weight of the polymer composite. In one embodiment, the thermoplastic composite contains pearlescent compounds and no metal compound. In another embodiment the thermoplastic composite contains pearlescent compounds and metal compound (s). In a preferred embodiment, the thermoplastic composite contain metal compound(s) and no pearlescent compound.

The thermoplastic composite further contains a metallic and/or pearlescent material.

Metal compounds useful in the invention include, but are not limited to, metal flakes, chips and filings. Useful metal compounds include metals, metal-containing molecules and complexes of transition metals, or lanthanide metals, and combinations thereof. Examples include aluminum, copper, silver, gold, platinum, palladium, nickel, cobalt, tin, niobium, chromium, stainless steel and combinations or alloys thereof, including for example brass and bronze The metal compound may also be a metal carbide, metal oxide, metal nitride, metal sulfide, and combinations thereof. The metal compounds can have particle sizes averaging from 5 microns to 125 micron and preferably 50 micron to 100 micron in the largest direction. The metal compounds may be flat flakes, or may be particles of various shapes. Metal flake pigments generally have a thickness in the range of from 40 to 150 nm.

Pearlescent compounds useful in the invention are those known in the art and include, but are not limited to, platelets of mineral mica which is muscovite or potassium aluminum hydroxide fluoride, and platelets based on titanium dioxide. The platelets of are coated with a thin layer of metal oxide selected from the group consisting of rutile titanium dioxide, ferric oxide and tin oxide and mixtures thereof. The pearlescent compound platelets generally have a particle size of about 2 to about 130 microns, more preferably about 10 to about 50 microns. The pearlescent pigment platelets based on mica comprises about 30 wt. % to 75 wt. %, more preferably 35 wt. % to 72 wt. % of mica; about 20 wt. % to about 70 wt. %, more preferably about 25 wt. % to about 67 wt. % of rutile titanium dioxide. The pearlescent pigments may be colored or non-colored.

In one embodiment of the present invention, the composite plastics compositions of the present invention are prepared by compounding or blending the crosslinked polymer, and the metallic and/or opalescent materials with the thermoplastic matrix material by dispersing the particles and materials using a suitable heat processing treatment. Suitable heat processing treatments include, for example, extrusion blending, hot-melt kneading and hot-melt batch mixing. For example, the crosslinked polymer particles and metallic or opalescent materials may be melt processed by hot melt extrusion blending or compounding with thermoplastic matrix particles and the resultant composite plastic composition is recovered in particulate form, such as pellets. Hot-melt batch mixing may include dispersion of the crosslinked particles and metallic/opalescent materials into a melt of the thermoplastic matrix in a conventional batch mode, such as a stirred kettle; alternatively, the thermoplastic may be heated and mixed with a carrier solvent, such as toluene, and then batch mixed with the crosslinked particles and metallic/opalescent materials, followed by flash evaporation of the solvent; the resultant composite plastic composition can then be granulated by conventional means. The resultant pellets or granules are typically translucent or opaque to clear, containing distinct "speckle-like" particles, the latter being-representative of the crosslinked polymer used in the compounding process.

Typically 2 to 28 weight percent, preferably 5 to 25 and more preferably 5 to 15 weight percent, of crosslinked polymer particles are combined with 3 to 7 weight percent of metallic or opalescent materials and 55 to 90 weight percent, preferably from 60 to 85 weight percent and more preferably from 60 to less than 80 weight percent, (these percentages adding to 100) thermoplastic particles, based on the combined weight of crosslinked polymer, metallic/opalescent materials and thermoplastic particles. The extrusion blending process allows for a relatively uniform distribution of the thermoset material throughout the thermoplastic matrix without requiring similar densities of the two materials, as is typically required in conventional casting processes used in the prior art. Preferably a low-shear screw design is used to minimize processing problems, such as residual monomer odor, vent plugging, flowability problems and stranding problems.

The extrusion blending is preferably used to form particles that are then extruded or co-extruded to form the final sheet. It is possible that the extrusion blending can be used to directly form the thermoplastic composite sheet, and the blending can even be used in a multi-layer extrusion over a substrate and/or with a capstock.

Extrusion temperatures are typically in the range of 220° C. to 260° C. and the extruder screw design should provide low shear to prevent the loss of the distinct granite-like appearance and to maintain particle integrity. The cooling bath temperature (strand takeup) is typically maintained at about 60-70° C. and the vent section of the extruder may be vacuumed to minimize pelletization problems.

During the extrusion blending process, control of the particle size of crosslinked polymer is important for optimum processing and ultimate "granite-like" appearance of the finished articles. When the particles are very large, that is, greater than about 1.2 mm or 16 mesh, "stranding" problems may develop during sheet extrusion or extrusion blending processes. When the particles are much smaller than about 0.2 mm or 70 mesh, the extruder die may plug frequently and stranding problems may develop; in addition, poor "granite-like" appearance occurs. If the crosslinking level is too low, that is, below about 0.5%, the crosslinked polymer particles may "smear" into thermoplastic matrix material after multiple passes during extrusion, resulting in blurred or non-differentiated mineral-like appearance. If the crosslinking level is too high, that is, above about 10%, the yield of desired particle size during the comminution step is reduced due to generation of fine particles smaller than about 0.2 mm (70 mesh) and the sheet surfaces of the final article may be rough and require a secondary treatment such as press polishing. Preferably, the crosslinker level is from 0.5 to 5% and more preferably from 1 to 4%.

A transparent cap layer form the outer layer of the multi-layer polymeric article. The transparent cap layer is a thermoplastic material the may be coextruded onto the thermoplastic composite polymer layer, laminated onto the thermoplastic composite, or attached to the thermoplastic composite using an adhesive. A preferred method for forming the multi-layer article is by co-extrusion. A capstock layer is generally a thin protective layer extruded over the thermoplastic composite layer to provide protection, control texture after thermoforming and enhance appearance. The capstock also improves weatherability of the finished article. While not being bound to any particular theory, it is also believed that the capstock prevents exposure of the metal particles, which would cause problems in weatherability. Even metal particles near the surface of the matrix polymer could eventually be exposed to the environment through deterioration of a thin matrix covering, without the capstock layer. Thus the capstock prevents exposed metal materials at the surface, causing safety and environmental issues.

The cap layer is transparent, but may contain dyes and other additives such as UV stabilizers.

In one embodiment, the cap layer is a poly(meth)acrylate polymer or copolymer. The cap layer may contain up to 60 weight percent of impact modifier, preferably 5-30 weight percent, and may also contain other adjuvants. A preferred composition is an impact modified acrylic copolymer having 80-95 weight percent of methyl methacrylate units and 5 to 20 percent of $C_{1-4}$ acrylate monomer(s).

The composite plastics compositions of the present invention can be coextruded with other high-impact grade thermoplastics such as ABS terpolymer, ASA copolymer, polycarbonate, MBS copolymer, HIPS, acrylonitrile/acrylate copolymer, acrylonitrile/methyl methacrylate copolymer, impact modified polyolefins and impact modified PVC, to produce a multilayer composite sheet useful for spa, sanitary ware, countertops, bathroom and kitchen fixtures, wall decorations, pool stairs, automobile and truck bodies and parts and other thermoforming applications that would benefit from the look and textures available from the present invention. In forming a multi-layered sheet a multi-manifold die (duel triple or greater is preferred for layer control.

A multi-layer sheet containing the thermoplastic polymer layer of the invention could also be formed in a lamination process.

Articles made from the multi-layer sheet may be formed into articles by means of a thermoforming process. Thin layers of the capped composite polymer may also be used in insert molding applications.

The over-all appearance (color, pattern, texture) of a multi-layered article may be selected by varying several different parameters of the composite layer, the substrate layer, and possibly from the cap layer. The cross-linked polymer particles can be of various sizes, colors and loading. The metallic or opalescent materials may also be of various sizes, types and loading. If the composite layer is transparent or opaque, the substrate layer color will influence the final appearance. The cap stock could also contain some coloration that would affect the final appearance. The texture of the multi-layer composition can be adjusted by the size, shape and loading of the crosslinked particles and metallic and/or opalescent materials. The texture can also be modified by the type, and especially the thickness of the transparent cap layer. The surface texture can also be modified through the use of an embossing—or other texturing rollers following extrusion.

As previously mentioned, the ability to extrude and co-extrude sheet using the composition of the invention, allows for almost an infinite number of final appearances, by varying the substrate color, the amount of metallic and/or opalescent materials, the type or types of metallic/opalescent materials, and the coloration, if any, or the matrix polymer. The composite layer needs to be thick enough so that the appearance and color remains after thermoforming. In one embodiment, the composite layer should be 30 mils or greater after thermoforming to provide UV protective screening for an ABS substrate layer. If the layer is a opaque the matrix layer provides UV protection at a minimum thickness of 12 mils. However an effect layer will need to be thicker upon extrusion to prevent flow issues with the granite particles and metallic particles. Upon extrusion if the effect layer is to thin the granite particles will create flow patterns in the metallic particles.

The invention is further illustrated by way of example in the following Examples. All ratios, parts and percentages are expressed by weight unless otherwise specified, and all reagents used are of good commercial quality unless otherwise specified. Abbreviations used in the Examples and Tables are listed below with the corresponding descriptions.

EXAMPLES

Example 1

Using a single manifold die and a 5 layer feed block, a 3-layer sheet was extruded having a black ABS substrate layer (80 mil), a middle layer (25-30 mil) of SKA 202 56113 (PLEXIGLAS DR UVA 20 (89%), with 7% percent of crosslinked polymer particles (CS 3124) and PX 7000 (4%) (PLEXIGLAS VM (87.5%) and Metallic Flake Eckard (12.5%)) and a clear cap layer (5-10 mil) (SOLARKOTE A 200) The results are shown in Table 1

TABLE 1

| | Raw Material Composition | | | |
|---|---|---|---|---|
| | DR UVA 20 | VM-100 | CS3124 | PX7000 Flake |
| SKA 202-56113 A | 89.00% | 3.50% | 7.00% | 0.50% |

TABLE 2

| Extrusion equipment | |
|---|---|
| Cap | 1" single screw extruder |
| Core | 1" single screw extruder |
| Substrate | 1.25" single screw extruder |

TABLE 3

| Extrusion Conditions | Extrusion Temperatures | Extrusion RPM's/ Layer thickness |
|---|---|---|
| Cap | 450-475 F. | 40 RPM/24 mils |
| Core | 450-475 F. | 110 RPM/40 mils |
| Substrate | 460-489 F. | 65 RPM/60 mils |

TABLE 4

| Extrusion Conditions continued | |
|---|---|
| Roll Temperatures | 200/210/235 F. |
| Roll Line Speed | 1.05 ft/min |

Example 2

On a extrusion line as in example 1 or on a duel or triple manifold die the core and substrate layers could be extruded and a cap layer of film laminated to the first surface to protect and or control the texture of the effect layer.

What is claimed is:

1. A textured extruded multi-layer polymer composition comprising:
   a) a thermoplastic polymer composite layer comprising:
      1) a thermoplastic matrix polymer;
      2) 2 to 15 weight percent, based on the weight of the polymer composite, of one or more particulate crosslinked polymers dispersed within the matrix polymer, wherein said crosslinked polymer has an average particle size of from 0.2 to 1.2 millimeters, wherein said particulate cross-linked polymer comprises 0.1 to 20 weight percent of crosslinker and further comprises 0.1 to 15 weight percent inert filler, based on the total weight of the cross linked polymer, and wherein said crosslinked polymer is visually differentiable from the thermoplastic matrix polymer,
      3) 3 to 10 weight percent, based on the weight of the polymer composite, of metallic materials also dispersed; and
      4) 1 to 2 weight percent, based on the weight of the polymer composite, of at least one organic or inorganic pigment, and b) a thin transparent thermoplastic cap layer, having a thickness of from 5-10 mil, wherein said transparent thermoplastic cap layer comprises a poly(meth)acrylate polymer or copolymer.

2. The multi-layer polymer composition of claim 1, wherein said thermoplastic matrix polymer is selected from the group consisting of alkyl(meth) acrylate polymers and copolymers, acrylonitrile/butadiene/styrene (ABS) terpolymer, acrylonitrile/styrene/acrylate (ASA) copolymer, polycarbonate, polyesters, poly(butylene terephthalate), poly(ethylene terephthalate), methyl methacrylate/butadiene/styrene (MBS) copolymer, high impact polystyrene (HIPS), acrylonitrile/acrylate copolymer, acrylonitrile/methyl methacrylate copolymer, impact modified polyolefins, impact modified polyvinyl chloride (PVC), and impact modified polymethacrylates.

3. The multi-layer polymer composition of claim 1, wherein said matrix polymer is an impact modified poly(alkyl (meth)acrylate) polymer or copolymer.

4. The multi-layer polymer composition of claim 3 wherein the poly(alkyl(meth)acrylate) comprises a copolymer of 80 to 99 weight percent methyl methacrylate monomer units and 1 to 20 weight percent ($C_1$-$C_{10}$)alkyl acrylate monomer units, based on total weight of the poly(alkyl(meth)acrylate).

5. The multi-layer polymer composition of claim 1, wherein the inert filler is selected from one or more of titanium dioxide, iron oxide, alumina, pigments, carbon black and silica.

6. The multi-layer polymer composition of claim 1, wherein said particle size of the crosslinked polymer is from 0.3 to 1.2 millimeters.

7. The multi-layer polymer composition of claim 1, wherein said particle size of the crosslinked polymer is from 0.4 to 0.85 millimeters.

8. The multi-layer polymer composition of claim 1, wherein the crosslinked polymer comprises 0.5 to 10 weight percent of crosslinker.

9. The multi-layer polymer composition of claim 1, wherein the crosslinked polymer comprises 0.3 to 5 weight percent of inert filler.

10. The multi-layer polymer composition of claim 1, wherein said metallic material is metallic flake of a transition metal or lanthanide metal.

11. The multi-layer polymer composition of claim 10, wherein said metallic flake has an average thickness of from 40 to 150 nm.

12. The multi-layer polymer composition of claim 1, wherein said transparent thermoplastic cap layer comprises 5-60 weight percent of one or more impact modifiers.

13. The multi-layer polymer composition of claim 1, wherein said transparent thermoplastic cap layer comprises one or more UV stabilizers.

14. The multi-layer polymer composition of claim 1, further comprising a substrate layer selected from the group consisting of ABS terpolymer, ASA copolymer, polycarbonate, MBS copolymer, high impact polystyrene (HIPS), acrylonitrile/acrylate copolymer, acrylonitrile/methyl methacrylate copolymer, impact modified polyolefins and impact modified PVC.

15. The multi-layer polymer composition of claim 1 comprising an article.

16. The multi-layer polymer composition of claim 15 wherein said article comprises a spa, sanitary ware, countertops, bathroom and kitchen fixtures, wall decorations, pool stairs, or car or truck body or parts.

* * * * *